United States Patent
Chen et al.

(10) Patent No.: US 11,335,096 B2
(45) Date of Patent: May 17, 2022

(54) METHOD, SYSTEM AND ELECTRONIC DEVICE FOR PROCESSING AUDIO-VISUAL DATA

(71) Applicant: Hefei University of Technology, Anhui (CN)

(72) Inventors: Yanxiang Chen, Anhui (CN); Huadong Tan, Anhui (CN); Pengcheng Zhao, Anhui (CN); Guang Wu, Anhui (CN)

(73) Assignee: Hefei University of Technology, Hefei (CN)

( * ) Notice: Subject to any disclaimer, the term of this patent is extended or adjusted under 35 U.S.C. 154(b) by 0 days.

(21) Appl. No.: 17/038,311

(22) Filed: Sep. 30, 2020

(65) Prior Publication Data

US 2021/0303866 A1    Sep. 30, 2021

(30) Foreign Application Priority Data

Mar. 31, 2020   (CN) .......................... 202010257755.5

(51) Int. Cl.
*G06V 20/40*       (2022.01)
*G06K 9/62*        (2022.01)

(52) U.S. Cl.
CPC ............. *G06V 20/46* (2022.01); *G06K 9/629* (2013.01); *G06K 9/6256* (2013.01); *G06V 20/48* (2022.01)

(58) Field of Classification Search
CPC .......... G06K 9/00744; G06K 9/00758; G06K 9/6256; G06K 9/629; G06K 9/6267; G06N 3/0454; G06N 3/084
See application file for complete search history.

(56) References Cited

U.S. PATENT DOCUMENTS

| | | | |
|---|---|---|---|
| 2018/0018970 A1* | 1/2018 | Heyl | G10L 17/18 |
| 2021/0303866 A1* | 9/2021 | Chen | G06K 9/629 |
| 2021/0319321 A1* | 10/2021 | Krishnamurthy | G06N 3/0454 |
| 2021/0319322 A1* | 10/2021 | Krishnamurthy | G06N 3/084 |
| 2021/0321172 A1* | 10/2021 | Krishnamurthy | G06K 9/00744 |
| 2021/0390937 A1* | 12/2021 | Elgammal | G10H 1/368 |

FOREIGN PATENT DOCUMENTS

| | | |
|---|---|---|
| CN | 101470897 A | 7/2009 |
| CN | 108062753 A | 5/2018 |
| CN | 108924617 A | 11/2018 |
| CN | 109446990 A | 3/2019 |
| CN | 109874053 A | 6/2019 |
| CN | 109918539 A | 6/2019 |
| CN | 110147796 A | 8/2019 |

* cited by examiner

*Primary Examiner* — Aaron W Carter (57) ABSTRACT

A method, a system and an electronic device for processing audio-visual data. In the method, a first dataset is obtained, where the first dataset includes several data pairs, and each of the data pairs in the first dataset includes a video frame and an audio clip that match each other. A multi-channel feature extraction network model is established to extract the visual features of each video frame and the auditory features of each audio clip in the first dataset. A contrastive loss function model is established using the extracted visual features and the auditory features to train the multi-channel feature extraction network. A classifier is established to determine whether an input audio-visual data pair is matched.

10 Claims, 5 Drawing Sheets

METHOD, SYSTEM AND ELECTRONIC DEVICE FOR PROCESSING AUDIO-VISUAL DATA

CROSS-REFERENCE TO RELATED APPLICATIONS

This application claims the benefit of priority to Chinese Patent Application No. 202010257755.5, filed on Mar. 31, 2020. The content of the aforementioned application, including any intervening amendments thereto, is incorporated herein by reference in its entirety.

TECHNICAL FIELD

The present application relates to learning on multi-modal data features, and more particularly, to a method, a system and an electronic device for processing audio-visual data.

BACKGROUND

In this information age, a large amount of new data are generated on the Internet every moment, which are shown in many forms, such as texts, images, audios and videos, so some methods are needed to mine common information hidden among the multi-modal data. In the multi-modal data with different forms, visual information and auditory information are two kinds of extremely important information, and there is a natural connection between the visual information and the auditory information. For example, a sound of a dog and an image describing a dog both reflect an object of a dog. When hearing a barking of the dog, people will think of dogs in their minds. There are a lot of audio and visual data with internal connections, for example, the visual information and the auditory information in the video are in one-to-one correspondence. Therefore, in order to endow the machine such a capability as human, a method is required to learn the relationship between the visual information and their corresponding auditory information, and is combined with the effective information of the two in a way of audio-visual collaborative learning, thereby solving some practical problems based on multi-modal information.

In some existing audio-visual collaborative learning methods, most of them need to be combined with labeled data to obtain a preferable effect, but the acquisition of data labels requires a lot of manpower and material resources. Thus, these methods are obviously inefficient and undesirable due to huge amount of unlabeled data on the Internet. In addition, specific features need to be learned to established a connection between auditory and visual information. For example, in an image depicting a dog, the dog is the key information, while other background information are invalid noise information, which are the same goes for the audio.

Therefore, a method capable of discovering latent laws from the data itself and eliminating useless noise information is require to process unlabeled data, so as to broaden the scope of application of audio-visual collaborative learning.

SUMMARY

In view of the above-mentioned deficiencies of the prior art, an object of the present disclosure is to provides a method, a system and an electronic device for processing audio-visual data, so as to solve the technical problem that audio-visual collaborative learning method is inapplicable for unlabeled data in the prior art.

The first technical solutions of the disclosure are described as follows.

The present disclosure provides a method for processing audio-visual data, comprising:

(1) obtaining a first dataset, wherein the first dataset comprises a plurality of data pairs, and each of the data pairs in the first dataset comprises a video frame and an audio clip that match each other;

(2) establishing a multi-channel feature extraction network to extract a visual feature of each video frame and an auditory feature of each audio clip in the first dataset;

(3) establishing a contrastive loss function using the extracted visual features and auditory features to train the multi-channel feature extraction network; and (4) establishing a classifier to determine whether an input audio-visual data pair is matched.

In an embodiment, the step (4) comprises:

(4.1) obtaining a second dataset, wherein the second dataset comprises a plurality of data pairs, and each of the data pairs in the second dataset comprises a video frame and an audio clip, and a matching value therebetween;

(4.2) extracting a visual feature of each video frame and an auditory feature of each audio clip in each of the data pairs in the second dataset using the trained multi-channel feature extraction network;

(4.3) fusing the visual feature and the auditory feature of each of the data pairs in the second dataset to obtain a fusion feature of each of the data pairs in the second dataset;

(4.4) establishing the classifier and training the classifier using the fusion feature; and (4.5) determining whether an input audio-visual data pair to be determined is matched using the trained classifier.

In an embodiment, a step of training the classifier using the fusion feature in the step (4.4) comprises:

training the classifier by taking the fusion feature as an input of the classifier and combining the input with the preset loss function model.

In an embodiment, the preset loss function model is expressed as follows:

$$L_c = -\frac{1}{N}\sum_{j=1}^{N}(y_j \log(f(z_{concat};\theta_c)) + (1-y_j)\log(1-f(z_{concat};\theta_c)));$$

wherein, if $y_j=1$, $z_{concat}$ is the fusion feature obtained from a matched data pair in the second dataset; if $y_j=0$, $z_{concat}$ is the fusion feature obtained from an unmatched data pair in the second dataset; $\theta_c$ is the parameter of the classifier network model; N is the number of the data pairs in the second dataset.

In an embodiment, the step (2) comprises:

establishing a visual feature extraction network and an auditory feature extraction network, to extract the visual feature of each of the video frames and the auditory feature in each of the audio clips in the first dataset, respectively.

In an embodiment, a 3D convolutional layer, a 2D convolutional layer and a fully connected layer are connected in sequence to form the visual feature extraction network model.

In an embodiment, a plurality of convolutional layers and a fully connected layer are connected in sequence to form the auditory feature extraction network.

In an embodiment, the step (3) comprises:

(3.1) selecting a plurality of audio clips matched to their corresponding video frame to form a plurality of positive sample pairs, and selecting a plurality of audio clips unmatched to their corresponding video frame to form a plurality of negative sample pairs, thereby forming a third dataset;

(3.2) establishing an evaluation function model based on the extracted visual features and the extracted auditory features, wherein a value obtained from each of the positive sample pairs is larger than that of each of the negative sample pairs; and (3.3) establishing the contrastive loss function model based on the evaluation function model, and training the multi-channel feature extraction network using the contrastive loss function model.

In an embodiment, the step (3.3) comprises:

(3.3.1) approximately processing the established contrastive loss function model; and (3.3.2) training the multi-channel feature extraction network using the approximately processed contrastive loss function model.

The second technical solutions of the disclosure are described as follows.

The present disclosure provides a system for processing audio-visual data, comprising:

a unit for obtaining a first dataset, wherein the first dataset comprises a plurality of first audio-visual data pairs, and each of the first audio-visual data pairs comprises a video frame and an audio clip that match each other;

a unit for establishing feature extraction network, for establishing a feature extraction network to extract a visual feature of each of the video frames and an auditory feature of each of the audio clips in the first dataset;

a unit for training feature extraction network, for establishing a contrastive loss function model using the extracted visual features and the extracted auditory features to train the multi-channel feature extraction network; and a unit for establishing classifier and determination, for establishing a classifier to determine whether an input audio-visual data pair is matched.

In an embodiment, the unit for establishing classifier and determination comprises:

a subunit for obtaining a second dataset, wherein the second dataset comprises a plurality of data pairs, and each of the data pairs in the second dataset comprises a video frame and an audio clip, and a matching value therebetween;

a feature extraction subunit, for extracting the visual features of the video frame and the auditory features of the audio clip of each of the data pairs in the second dataset using the trained multi-channel feature extraction network;

a feature fusing subunit, for fusing the visual feature and the auditory feature of each of the data pairs in the second dataset to obtain a fusion feature of each of the data pairs in the second dataset;

a classifier establishing subunit, for establishing the classifier and training the classifier using the fusion feature; and a determining subunit, for determining whether an input audio-visual data pair is matched using the trained classifier.

In an embodiment, the determining subunit is further used for training the classifier by taking the fusion feature as an input of the classifier and combining the input with the preset loss function model.

In an embodiment, the preset loss function model is expressed as follows:

$$L_c = -\frac{1}{N}\sum_{j=1}^{N}(y_j\log(f(z_{concat};\theta_c)) + (1 - y_j)\log(1 - f(z_{concat};\theta_c)));$$

wherein, if $y_j=1$, $z_{concat}$ is the fusion feature obtained from a matched data pair in the second dataset; if $y_j=0$, $z_{concat}$ is the fusion feature obtained from an unmatched data pair in the second dataset; $\theta_c$ is the parameter of the classifier network model; N is the number of the data pairs in the second dataset.

In an embodiment, the unit for establishing feature extraction network model comprises:

a subunit for establishing visual feature extraction network; and a subunit for establishing auditory feature extraction network.

In an embodiment, a 3D convolutional layer, a 2D convolutional layer and a fully connected layer are connected in sequence to form the visual feature extraction network.

In an embodiment, a plurality of convolutional layers and a fully connected layer are connected in sequence to form the auditory feature extraction network.

In an embodiment, the unit for training feature extraction network comprises:

a subunit for obtaining a third dataset, for selecting a plurality of audio data clips matched to their corresponding video frame to form a plurality of positive sample pairs, and selecting a plurality of audio clips unmatched to their corresponding video frame to form a plurality of negative sample pairs, thereby forming a third dataset;

a subunit for establishing evaluation function model, for establishing an evaluation function model based on the extracted visual features and the extracted auditory features, wherein a value obtained from each of the positive sample pairs is larger than that of each of the negative sample pairs; and a subunit for establishing contrastive coding loss function model, for establishing the contrastive loss function model based on the evaluation function model, and training the multi-channel feature extraction network using the contrastive loss function model.

In an embodiment, the subunit for establishing contrastive coding loss function model comprises:

a subunit for approximately processing the established contrastive loss function model; and a subunit for training the multi-channel feature extraction network using the approximately processed contrastive loss function model.

The third technical solutions of the disclosure are described as follows.

The present disclosure provides an electronic device for processing audio and video data, comprising:

a communicator, for communicating with external devices;

a memory, for storing a computer program; and a processor, connected to the communicator and the memory, for running the computer program to execute any one of the above-mentioned methods for processing audio-visual data.

The fourth technical solutions of the disclosure are described as follows.

The present disclosure provides a computer-readable storage medium, wherein the computer-readable storage medium stores a computer program, and any one of the above-mentioned methods for processing audio-visual data is executed when the computer program runs.

The present disclosure provides a method for processing audio-visual data, in which a loss function is established by multi-modal contrastive encoding; visual part and audio part in the widely existing audio-visual data are divided into positive sample pairs and negative sample pairs according to a matching relationship; a visual feature extraction network and an auditory feature extraction network are trained by introducing a large number of negative sample pairs to minimize the loss function, and thus, a positive sample pair with a maximum mutual information is taken as a standard Internet parameter in a process of learning, thereby learning potential common feature information in data pairs of the audio-visual data.

The disclosure adopts a self-supervised learning method to establish a feature relationship in data pairs of the audio-visual data, and learns a feature expression that reflects the commonality; instead of relying on labeled data that requires a lot of manpower and material resource, the disclosure trains the feature extraction network using the widely existing unlabeled data, and obtains effective audio-visual features to process downstream tasks, thereby reducing the consumption of manpower and material resources. Therefore, the disclosure is a ideal feature learning method which broadens the scope of application of audio-visual collaborative learning.

DETAILED DESCRIPTION OF EMBODIMENTS

Described below are intended to illustrate embodiments of the present disclosure, so that those skilled in the art can easily understand other advantages and effects of the present disclosure from the contents revealed in the present specification. The present disclosure can also be implemented or applied through different specific embodiments, or various details in this specification can also be modified or changed based on different viewpoints and applications without departing from the spirit of the present disclosure.

Referring to FIGS. 1-6, it should be noted that the accompany drawings provided in this embodiment only illustrate a basic concept of the present disclosure in a schematic manner, and shows components related to the present disclosure, but not to be drew according to the number, shape and dimension of the components in actual implementation. In fact, the type, quantity and ratio of each component can be changed in different implementation, and a component layout may be more complicated.

Figure 1:
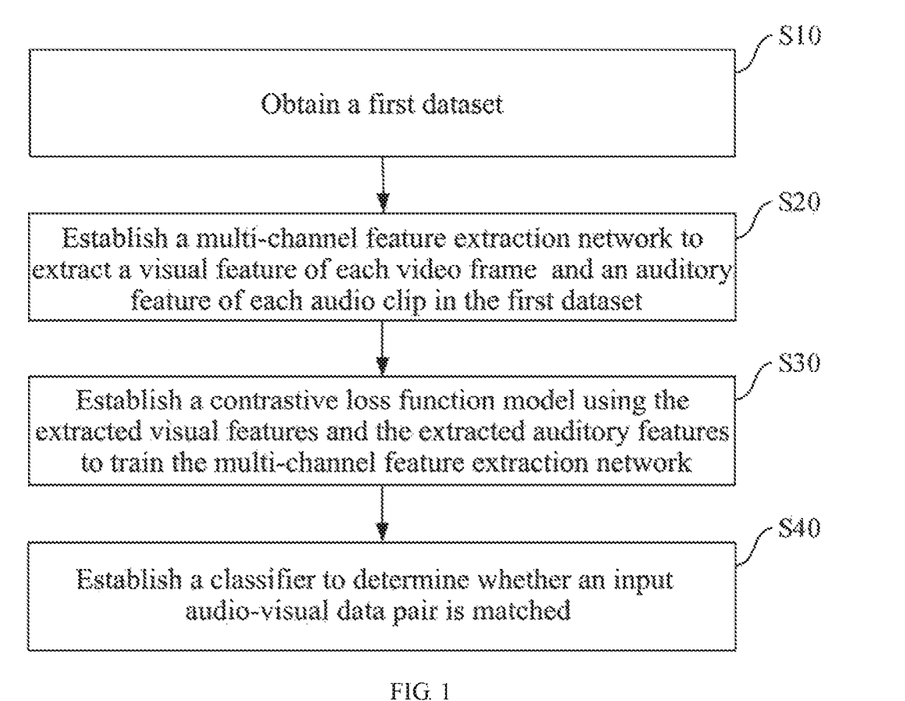
FIG. 1 shows a schematic flowchart of a method of processing audio-visual data according to the present disclosure.

FIG. 1 shows a schematic flowchart of a method for processing audio-visual data according to the present disclosure. As show in FIG. 1, in the method for processing audio-visual data according to the present disclosure, visual feature information and auditory feature information are extracted using a two-way deep neural network; a loss function is established by multi-modal contrastive encoding to train a feature extraction network; whether an audio-visual data pair is matched is determined using the learned audio-visual fusion features as inputs to the classifier. Specifically, the method includes the following steps:

S10, a first dataset is obtained, where the first dataset comprises a plurality of data pairs, and each of the data pairs in the first dataset comprises a video frame and an audio data clip that match each other;

S20, a multi-channel feature extraction network model is established to extract a visual feature of each video frame and an auditory feature of each audio clip in the first dataset;

S30, a contrastive loss function model is established using the extracted visual features and the extracted auditory features to train the multi-channel feature extraction network; and S40, a classifier is established to determine whether an input audio-visual data pair is matched.

Figure 3:
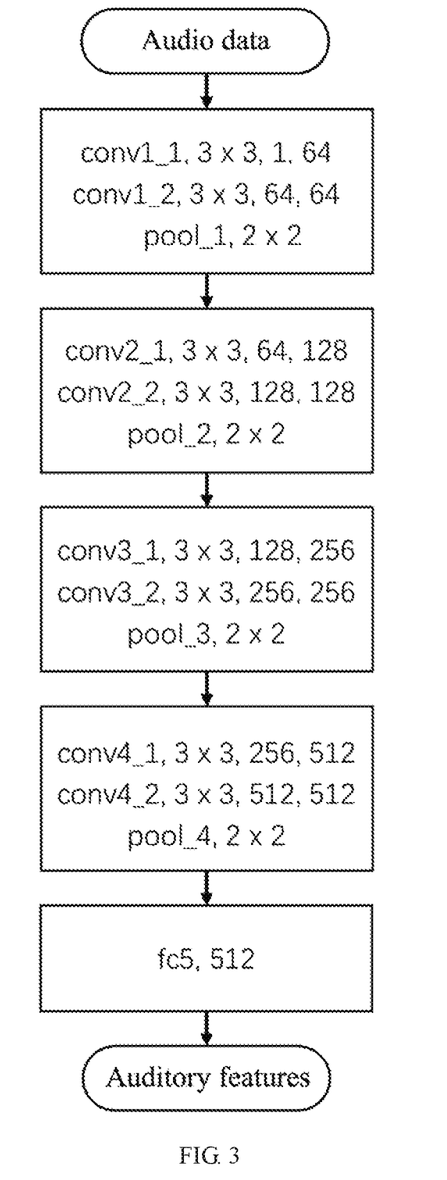
FIG. 3 shows a block diagram of an auditory feature extraction network according to the present disclosure.
Figure 4:
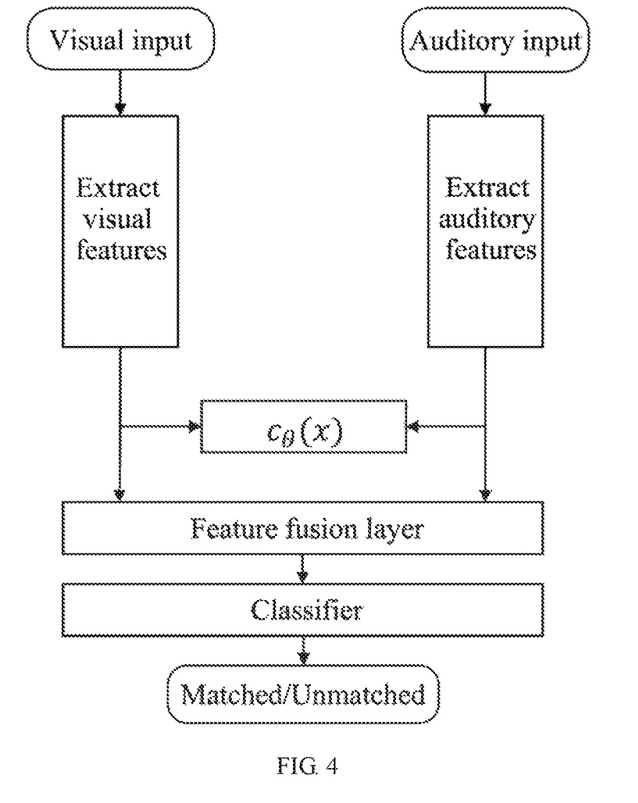
FIG. 4 shows an overall network architecture of the method for processing audio-visual data according to the present disclosure.

FIG. 4 shows an overall network architecture of the method for processing audio-visual data according to the present disclosure. The technical solutions of the present disclosure will be described in detail below with reference to FIGS. 1-4.

Firstly, the step S10 is processed, as shown in FIGS. 1-4, the first dataset is obtained, where the first dataset includes a plurality of data pairs, and each of the data pairs in the first dataset includes a plurality of video frames and their matched audio clips. Specifically, one or more videos are divided into multiple video segments, and a visual part and an audio part in each of the video segments are extracted and processed to form the first dataset, where each of the video frame in the first dataset are served as an input to the visual feature extraction network in the step S20, and each of the audio clips in the first dataset serves as an input to the auditory feature extraction network in the step S20.

In an embodiment, in the video that generates the first dataset (or audio-visual data), there are visual information and audio information that are related to each other, for example, in audio-visual data that describes the picture and the sound of a dog, the sound of the dog and the pictures depicting the dog both reflect the object of the dog.

In an embodiment, in the step of dividing one or more videos into multiple video segments, the video data are divided into multiple video segments using the opencv tool (or other suitable tools), where a duration of each of the video segments is preset, and the duration can be flexibly adjusted according to actual needs, for example, the duration can be preset as 1 s.

In an embodiment, in the step of extracting and processing the visual part and the audio part in each of the video segments to form the first dataset, the visual part and the auditory part of each of the video segments are extracted using the FFmpeg tool (or other suitable tools); for the auditory part, a Log-Mel Spectrogram (LMS) corresponding to each of audio clip segments is taken as an audio clip using a librosa library of Python; in other embodiments, of course, a short-time Fourier transform spectrogram (STFT), or a Mel-Frequency Cepstral Coefficients (MFCC) or a Mel-Spectrum (MS) corresponding to each of audio data unit segments is also used as an audio clip, where the LMS is preferable; for the visual part, multi-frame images with a duration of is are selected as the video frame, thereby obtaining a dataset $D=\{(v_1,a_1), \ldots, (v_j,a_j), \ldots, (v_n,a_n)\}$, where $v_j$ represents the j-th video frame; $a_j$ represents the j-th audio clip; $v_j$ and $a_j$ are strictly aligned in timing and semantics; and the dataset D is the first dataset.

Secondly, the step S20 is processed; as shown in FIGS. 1-4, a visual feature extraction network and an auditory feature extraction network are established to extract a visual feature of each video frame and an auditory feature of each audio clip in the first dataset, respectively; specifically, the step S20 includes the step S21 for establishing a visual feature extraction network and the step S22 for establishing an auditory feature extraction network.

Figure 2:
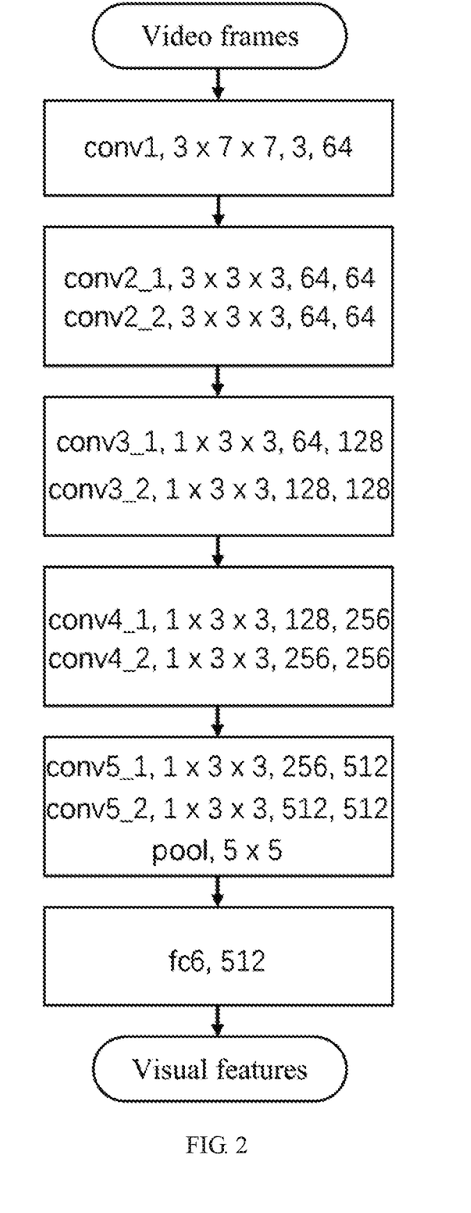
FIG. 2 shows a block diagram of a visual feature extraction network according to the present disclosure.

In the step S21, a 3D convolutional layer, a 2D convolutional layer and a fully connected layer are connected in sequence to form the visual feature extraction network model. FIG. 2 shows a structural block diagram of a visual feature extraction network according to the present disclosure. As shown in FIG. 2, an initial part of the visual feature extraction network is composed of the 3D convolutional layer, and connected to multiple layers of 2D convolutional layers (FIG. 2 shows specific network parameters, where conv represents convolutional neural network; 3×7×7 represents three-dimensional convolution, and a size of a convolution kernel is 7×7; 3 represents an input dimension; 64 represents an output dimension; pool represents a pooling layer; and fc represents the fully connected layer); spatiotemporal features of visual information (i.e., the video frame) composed of multi-frame image data are extracted by combining the 3D convolutional neural network with the 2D convolutional neural network, and finally 512-dimensional visual features are obtained by performing feature dimension transformation through the fully connected layer. It should be noted that, in other embodiments, feature extraction networks with other suitable structures may also be adopted, which is not limited thereto.

In the step S22, a plurality of convolutional layers and a fully connected layer are connected in sequence to form the auditory feature extraction network. FIG. 3 shows a structural block diagram of the auditory feature extraction network according to the present disclosure. As shown in FIG. 3, the auditory feature extraction network obtains 512-dimensional auditory features corresponding to the audio clip by taking the LMS corresponding to the clip as an input, and extracting the feature information of the clip (detailed network parameters are shown in FIG. 3) using multiple convolutional layers.

Thirdly, the step S30 is processed; as shown in FIGS. 1-4, a contrastive loss function model is established using the extracted visual features and the extracted auditory features to train the multi-channel feature extraction network. Specifically, the step S30 includes the following steps:

S31, for the data in the first dataset, a plurality of audio clips matched to their corresponding video frame are selected to form a plurality of positive sample pairs, and a plurality of audio clips unmatched to their corresponding video frame are selected to form a plurality of negative sample pairs, thereby forming a third dataset;

S32, an evaluation function model is established based on the extracted visual features and the extracted auditory features, wherein a value obtained from each of the positive sample pairs is larger than that of each of the negative sample pairs; and S33, the contrastive loss function model is established based on the evaluation function model, and training the multi-channel feature extraction network model using the contrastive loss function model.

In an embodiment, in the step S31, for the data in the dataset D, the visual data $v_i$ (i.e., any video frame clip $v_i$) is taken as a guide; an audio clip $a_i$ uniquely matched to the guide is selected to form a positive sample pair, and then k audio clips $\{a_1, \ldots, a_k\}$ unmatched to the guide are selected to form a plurality of negative sample pairs, where there are two type of negative example pairs: one is the audio and visual part that does not correspond to the time in the same video, and the other is the audio and visual part in different videos, so that a dataset $S=\{v_i, a_i, a_1, \ldots, a_k\}$ is formed.

In an embodiment, in the step S32, the visual features $z_v$ and the auditory features $z_a$ are extracted using the visual feature extraction network and the auditory feature extraction network, respectively, where $z_v = f_v(v, \theta_v)$, $z_a = f_a(a, \theta_a)$, $\theta_v$ and $\theta_a$ are parameters of the visual feature extraction network and the auditory feature extraction network, respectively. The evaluation function (model) is expressed as follows:

$$c_\theta(\{v, a\}) = e^{z_v^T w_{va} z_a},$$

where $w_{va}$ is the parameter of the evaluation function, and a standard of the evaluation for the audio-visual data pairs is that a value $\{v_i, a_i\}$ obtained from each of the positive sample pairs is larger than a value $\{v_i, a_j\}$ obtained from each of the negative sample pairs.

In an embodiment, in the step S33, the contrastive loss function model is established based on the evaluation function model $c_\theta(\{v,a\})$:

$$L_{v,a} = -\frac{E}{S}\left[\log \frac{c_\theta(\{v_i, a_i\})}{\sum_{j=1}^{k+1} c_\theta(\{v_i, a_j\})}\right];$$

where E represents a mathematical expectation of the dataset S.

Based on the above equation, obtained: $I(z_v, z_a) \geq \log(k) - L_{v,a}$, where $I(z_v, z_a)$ are mutual information between $z_v$ and $z_a$, k is the number of the negative sample pairs, and the value of k should be larger to ensure that the mutual information is large enough, where a range of specific value can be 2000-10000. Therefore, when the value $L_{v,a}$ of the loss function is minimized, a lower boundary $I(z_v, z_a)$ can be maximized, so that each of the visual features can be associated with its matching auditory feature, and the features learned by the network can maximize a commonality therebetween, that is, the multi-channel feature extraction network model can be trained using the contrastive loss function model.

It can be seen from the loss function in the step S33 that, the larger the number k of negative sample pairs is, the larger a size of the mutual information between $z_v$ and $z_a$, so a large number of negative sample pairs are required to participate in the calculation of the loss function, which causes to a large computing difficulty of the loss function. Therefore, as an improvement, in the step S33, the established contrastive loss function model is approximately processed, and the multi-channel feature extraction network is trained using the approximately processed contrastive loss function model.

Specifically, the loss function can be approximately calculated by combining with the Noise Contrastive Estimation (NCE) algorithm, where a working principle thereof is to compare a real training sample with a batch of noise samples, thereby finding a data rule of the real sample, that is, the calculation is converted to a binary classification problem, where the real sample is determined as 1, and the noise samples are determined as 0, and the noise samples are uniformly distributed. A probability that an auditory data $$a \in \{a_j \mid j = 1, 2, \ldots, k+1\}$$

matches to a selected visual data $v_i$ is:

$$p(a|v_i) = \frac{c_\theta(\{v_i, a\})}{\sum_{j=1}^{k+1} c_\theta(\{v_i, a_j\})};$$

m noise samples are selected to compare with each of the data samples respectively, where the visual data is taken as the guide, then a posterior probability of the auditory data a from the real sample distribution is:

$$P(d = 1|a; v_i) = \frac{p_d(a|v_i)}{p_d(a|v_i) + m \cdot p_n(a|v_i)};$$

where $p_d$ represents the distribution of real samples: $p_n(\cdot|v_i) = 1/N$ represents the distribution of selected noise samples, where the noise samples are uniformly distributed; and the probability of occurrence of each of the noise samples is 1/N. Therefore, an approximate estimation value of the contrastive loss function model in the step S33 can be obtained as follows:

$$L_{NCE}^{v,a} = -\mathop{E}_{v_i \sim p_d(v)}\{\mathop{E}_{a \sim p_d(\cdot|v_i)}[\log(P(d=1|a;v_i))] + m\mathop{E}_{a \sim p_n(\cdot|v_i)}[\log(P(d=0|a;v_i))]\}.$$

Based on the above loss function and combined with the gradient descent algorithm, parameters in the network are updated by repeatedly obtaining the gradient to process back propagating, so that a value of the above loss function is minimized, and finally the required parameter distribution is learned through parameter fitting, thereby learning the required audio-visual data features.

Finally, the step S40 is processed; as shown in FIGS. 1-4, the classifier is established to determine whether an input audio-visual data pair is matched, and the step S40 includes the following steps:

S41, a second dataset is obtained, where the second dataset comprises a plurality of data pairs, and each of the data pairs in the second dataset comprises a video frame and an audio clip, and a matching value therebetween;

S42, a visual feature of each of the video frame and an auditory feature in each of the audio clip in each of the data pairs in the second dataset are extracted using the trained multi-channel feature extraction network:

S43, the visual feature and the auditory feature of each of the data pairs in the second dataset are fused to obtain a fusion feature of each of the data pairs in the second dataset;

S44, the classifier is established and the classifier is trained using the fusion feature; and S45, whether an input audio-visual data pair is matched is determined using the trained classifier.

In an embodiment, in the step S41, a dataset (i.e. the second dataset) $\Omega = \{(v_1, a_1, y_1), \ldots, (v_j, a_j, y_j), \ldots, (v_N, a_N, y_N)\}$ is established, where $y_j = 1$ represents a data pair that $v_j$ and $a_j$ are matched, and $y_j = 0$ represents a data pair that $v_j$ and $a_j$ are not matched.

In the step S42 and the step S43, for each data pair in the dataset, the 512-dimensional visual feature $z_v$ and 512-dimensional auditory feature $z_s$ of each data pair are extracted using the feature extraction network trained in the step S30, and a 1024-dimensional fusion feature $z_{concat}$ are finally obtained by fusing the feature $z_v$ and the feature $z_s$ in a feature fusion layer in FIG. 4.

In an embodiment, as shown in the FIG. 4, in the step S44, the fusion feature $z_{concat}$ is used as an input of the classifier, and whether the input audio-visual data pair is matched is determined using an output of the classifier. The classifier is specifically composed of two fully connected layers, where the numbers of the corresponding neurons thereof are 128 and 1, respectively. A cross-entropy loss is used as a loss function of the classifier, where its specific form is expressed as follows:

$$L_c = -\frac{1}{N}\sum_{j=1}^{N}(y_j \log(f(z_{concat};\theta_c)) + (1-y_j)\log(1-f(z_{concat};\theta_c)));$$

where if $y_j = 1$, $z_{concat}$ represents the fusion feature obtained from the matched data pair in the second dataset; if $y_j = 0$, $z_{concat}$ represents the fusion feature obtained from the unmatched data pair in the second dataset: $\theta_c$ is the parameter of the classifier network model; and N is the number of the data pairs in the second dataset.

In an embodiment, in the step S45, according to the loss function in the step S44, the classifier is trained using a stochastic gradient descent algorithm, and parameters of the classifier are updated by minimizing the cross-entropy loss function, but the parameters in the feature extraction network in the step S30 is not updated, so that the classifier can distinguish the matching audio-visual data pairs, in which the classification accuracy rate is used as an evaluation index of audio-visual collaborative learning.

Figure 5:
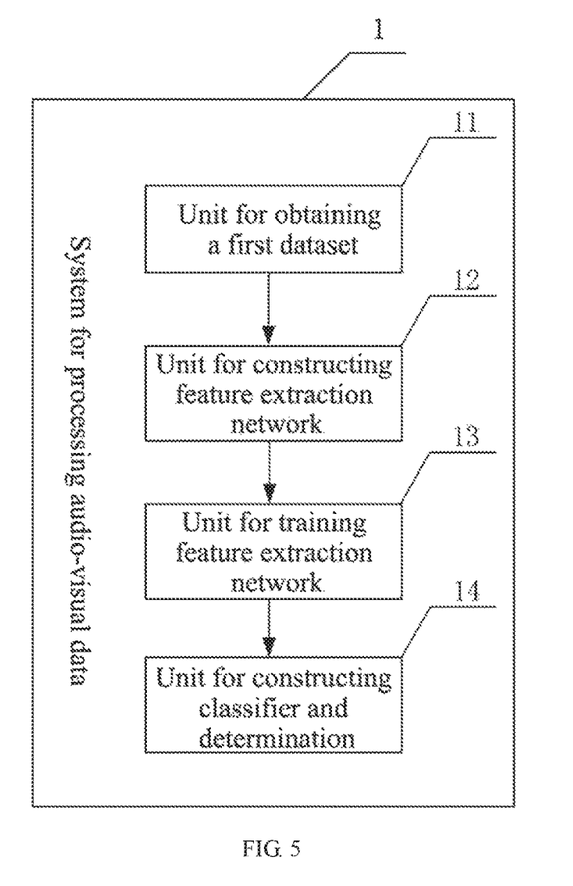
FIG. 5 shows a block diagram of a system for processing audio-visual data according to the present disclosure.

An embodiment of the present disclosure further provides a system for processing audio and video data, and FIG. 5 shows a structural block diagram of the system for processing audio-visual data according to the embodiment. As shown in FIG. 5, the system 1 includes a unit for obtaining a first dataset 11, a unit for establishing feature extraction network 12, a unit for training feature extraction network 13, and a unit for establishing classifier and determination 14, where the unit for obtaining the first dataset 11 is a functional module implemented in the step S10 for obtaining the first dataset; the first dataset includes a plurality of first audio-visual data pairs, and each of the first audio-visual data pairs comprises a video frame and an audio clip that match each other; the unit for establishing feature extraction network 12 is a functional module for implementing the step S20, which is used for establishing a multi-channel feature extraction network to extract visual features of each video frame and auditory features of each audio clip in the first dataset; the unit for training feature extraction network 13 is a functional module for implementing the step S30, which is used for establishing a comparison coding loss function using the extracted visual features and the extracted auditory features to train the multi-channel feature extraction network; the unit for establishing classifier and determination 14 is a functional module for implementing the step S40, which is used for establishing a classifier to determine whether an input audio-visual data pair to be determined is matched.

In the embodiment, the unit for establishing feature extraction network model 12 includes a subunit for establishing visual feature extraction network, which is used as a functional module for implementing the step S21; and a subunit for establishing auditory feature extraction network, which is used as a functional module for implementing the step S22. In an embodiment, FIG. 2 shows a structural block diagram of a visual feature extraction network according to the present disclosure, where a 3D convolutional layer, a 2D convolutional layer and a fully connected layer are connected in sequence to form the visual feature extraction network. In an embodiment, FIG. 3 shows a structural block diagram of an auditory feature extraction network according to the present disclosure, where a plurality of convolutional layers and a fully connected layer are connected in sequence to form the auditory feature extraction network.

In the embodiment, the unit for training feature extraction network model 13 includes: a subunit for obtaining third dataset, which is a functional module for implementing the step S31, and is used for selecting a plurality of audio clips matched to their corresponding video frame to form a plurality of positive sample pairs, and selecting a plurality of audio clips unmatched to their corresponding video frame to form a plurality of negative sample pairs, thereby forming a third dataset; a subunit for establishing evaluation function model, which is a functional module for implementing the step S32, and is used for establishing an evaluation function model based on the extracted visual features and the auditory features, where a value obtained from each of the positive sample pairs is larger than that of each of the negative sample pairs; and a subunit for establishing contrastive coding loss function model, which is a functional module for implementing the step S33, and is used for establishing contrastive coding loss function model, for establishing the contrastive loss function model based on the evaluation function model, and training the multi-channel feature extraction network using the contrastive loss function model.

In order to reduce a computing difficulty of the contrastive loss function model, the subunit for establishing contract coding loss function may further includes: a subunit for approximately processing the established contrastive loss function model; and a subunit for training the multi-channel feature extraction network model using the approximately processed contrastive loss function model.

In the embodiment, the unit for establishing classifier and determination 14 includes: a subunit for obtaining a second dataset, which is a functional module for implementing the step S41, and is used for obtaining the second dataset, where the second dataset comprises a plurality of data pairs, and each of the data pairs in the second dataset comprises a video frame and an audio clip, and a matching value therebetween; a feature extraction subunit, which is a functional module established for implementing the step S42, and is used for extracting the visual features of the video frame and the auditory features of the audioclips of each of the data pairs in the second dataset using the trained multi-channel feature extraction network; a feature fusing subunit, which is a functional module for implementing the step S43, and is used for fuse the visual feature and the auditory feature of each of the data pairs in the second dataset to obtain each fusion features of the data pairs; a classifier establishing subunit, which is a functional module for implementing the step S44, and is used for establishing the classifier and training the classifier using the fusion feature; and the determining subunit, which is a functional module for implementing the step S45, and is used for determining whether an input audio-visual data pair to be determined is matched using the trained classifier.

Specifically, the classifier establishing subunit is further used for training the classifier by taking the fusion feature as an input of the classifier and combining the input with the preset loss function model. In an embodiment, the preset loss function model is expressed as follows:

$$L_c = -\frac{1}{N}\sum_{j=1}^{N}(y_j\log(f(z_{concat};\theta_c)) + (1 - y_j)\log(1 - f(z_{concat};\theta_c)));$$

where $z_{concat}$ represents the fusion feature; $y_j$ represents the matching value of the jth data pair in the second dataset; if $y_j=1$, $z_{concat}$ is the fusion feature obtained from a matched data pair in the second dataset; if $y_j=0$, $z_{concat}$ is the fusion feature obtained from an unmatched data pair in the second dataset.

It should be noted that, in this embodiment, the functions of the units are described in the steps in the above-mentioned method, which are not repeated herein.

Besides, the functional units of the above-mentioned system may be fully or partially integrated into a physical entity or physically separated during actual implementation. Besides, these units are implemented in the form of software calling through processing elements; or implemented in the form of hardware; or some units are implemented in the form of software calling through processing elements, and other units are implemented in hardware. In addition, all or part of these units can be integrated together, or independently implement the embodiment. The processing element described herein may be an integrated circuit with signal processing capabilities. In an implementation process, each step of the above-mentioned method or each unit above may be completed by an integrated logic circuit of hardware in a processor element or instructions in the form of software.

Figure 6:
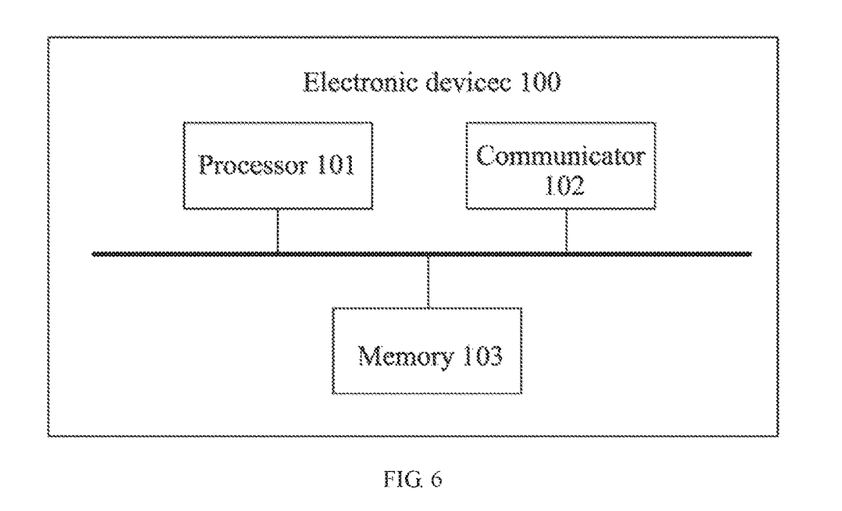
FIG. 6 shows a block diagram of an electronic device for processing audio-visual data according to the present disclosure.

As shown in FIG. 6, the above-mentioned method for processing audio-visual data in the embodiment may also be implemented via an electronic device 100, where the electronic device includes a memory 103, a processor 101, and a communicator 102 connected to each other, and the memory 101 stores a computer program that implements the method for processing the audio and video data when it is executed by the processor 101.

The processor 101 may be a general-purpose processor, including a central processing unit (CPU), a network processor (NP), etc.; and may also be a digital signal processor (DSP), an Application Specific Integrated Circuit (ASIC), a Field-Programmable Gate Array (FPGA) or other programmable logic devices, discrete gates or transistor logic devices, discrete hardware components; the memory 103 may include a Random Access Memory (RAM), and may further include a non-volatile memory, such as at least one disk memory.

When the computer program in the memory 103 is implemented in the form of a software functional unit and sold or used as an independent product, it can be stored in a computer-readable storage medium. Therefore, the technical solution of the present disclosure essentially or part of the contribution to the existing technology or part of the technical solution can be embodied in the form of a software product, which is stored in a storage medium, including several instructions for controlling a computer device (which may be a personal computer, an electronic device, or a network device) to perform all or part of the steps of the methods of the embodiments of the present disclosure.

In summary, the present disclosure provides a method for processing audio-visual data, in which visual information and auditory information in video data are extracted through a two-way deep neural network, respectively; for the data features in these two modalities, a loss function is designed through multi-modal contrastive coding; the network is trained using the noise contrastive estimation algorithm to maximize the mutual information between the matching video frame and the audio clip, thereby learning the common characteristics of the matched audio-visual data; finally, a two-bounded classifier is designed; two modal data features are obtained using the trained feature extraction network, which are fused as an input of the classifier; and the classifier is trained by combining the input with the cross-entropy loss function to determine whether the input audio-visual data pair matches. The method establishes a connection between the related audio-visual data through multi-modal contrast coding, and learns a feature expression that reflects the commonality between the two. This self-supervised learning method can use the widely existing unlabeled audio-visual data, so that it can no longer rely on labeled data that requires a lot of manpower and material resources, thereby broadening the scope of application of the method of audio-visual collaborative learning, and better learning the common characteristics between audio-visual data.

In the description, many specific details are provided, such as embodiments of components and/or methods, to provide a thorough understanding of embodiments of the disclosure. However, those skilled in the art will recognize that embodiments of the disclosure may be implemented without one or more specific details or may be implemented through other devices, systems, components, methods, units, materials, parts, etc. In other cases, well-known structures, materials, or operations are not specifically shown or described in detail to avoid obscuring aspects of the embodiments of the present disclosure.

Throughout the specification, such as "one embodiment", "an embodiment" or "a specific embodiment" described as above means that a specific feature, a structure or a characteristic described in connection with the embodiment is included in at least one embodiment of the present disclosure, but not necessarily in all embodiments. Thus, the phrases "in one embodiment", "in an embodiment" or "in a specific embodiment" in different places throughout the specification in various expression do not necessarily refer to the same embodiment. Furthermore, the specific features, structures, or characteristics of any specific embodiment of the present disclosure can be combined with one or more other embodiments in any suitable manner. It should be understood that other variations and modifications of the embodiments of the disclosure described and illustrated herein may be based on the description and should be considered as a part of the spirit and scope of the disclosure.

It should further be understood that one or more of elements shown in the accompanying drawings can also be implemented in a more separated or integrated manner, or even removed because it is inoperable in certain circumstances or provided because it can be useful depending on the particular application.

In addition, unless otherwise clearly indicated, any marked arrows in the accompanying drawings should be regarded as exemplary only, but not limiting; the term "or" as used herein is generally intended to mean "and/or". Where the term is foreseen because it is unclear to provide the ability to separate or combine, the combination of components or steps will also be deemed to have been specified.

As used in the description herein and throughout the claims below, unless otherwise indicated, "a", "an" and "the" can be understood to include plural form. Likewise, as used in the description herein and throughout the claims below, unless otherwise indicated, the meaning of "in" includes "in" and "on".

The above description of the illustrated embodiment of the disclosure (including the content in the abstract of the specification) is not intended to be an exhaustive list or to limit the disclosure to the precise form disclosed herein. Although specific embodiments and specific implementations of the disclosure are described herein for illustrative purposes only. As those skilled in the art recognize and understand, various equivalent modifications are possible within the spirit and scope of the disclosure. These modifications can be made to the disclosure in accordance with the above description of the described embodiments of the disclosure, and these modifications will be within the spirit and scope of the disclosure.

This document has generally described the system and method for better understand the details of the disclosure. In addition, various specific details have been given to provide a general understanding of the embodiments of the present disclosure. However, those skilled in the relevant art will recognize that the embodiments of the present disclosure can be implemented without one or more specific details, or implemented with other devices, systems, accessories, methods, components, materials, parts, etc. In other cases, well-known structures, materials, and/or operations have not been specifically shown or described in detail to avoid confusion about various aspects of the embodiments of the present disclosure.

Thus, although the present disclosure has been described herein with reference to specific embodiments thereof, freedom of modification, various changes, and substitutions are intended to be within the above disclosure, and it should be understood that in some cases, without departing from the scope of the proposed invention and on the premise of spirit, some features of the present disclosure will be adopted without correspondingly using other features. Therefore, many modifications can be made to adapt a particular environment or material to the essential scope and spirit of the present disclosure. The present disclosure is not intended to be limited to the specific terms used in the following claims and/or specific embodiments disclosed as the best mode envisaged to carry out, but the disclosure will include within any and all embodiments and equivalents which are fell into the scope of the following claims. Therefore, the scope of the present disclosure will be determined only by the appended claims.

What is claimed is:

1. A method for processing audio-visual data, comprising:
   (1) obtaining a first dataset, wherein the first dataset comprises a plurality of data pairs, and each of the data pairs in the first dataset comprises a video frame and an audio clip that match each other;
   (2) establishing a multi-channel feature extraction network to extract a visual feature of each video frame and an auditory feature of each audio clip in the first dataset;
   (3) establishing a contrastive loss function model using the extracted visual features and the extracted auditory features to train the multi-channel feature extraction network; and
   (4) establishing a classifier to determine whether an input audio-visual data pair is matched;
   the step (3) comprises:
   (3.1) selecting a plurality of audio clips matched to their corresponding video frames to form a plurality of positive sample pairs, and selecting a plurality of audio clips unmatched to their corresponding video frames to form a plurality of negative sample pairs, thereby forming a third dataset;

(3.2) establishing an evaluation function model based on the extracted visual features and the extracted auditory features, wherein a value obtained from each of the positive sample pairs is larger than that of each of the negative sample pairs; and (3.3) establishing the contrastive loss function model based on the evaluation function model, and training the multi-channel feature extraction network using the contrastive loss function model.

2. The method of claim 1, wherein the step (4) comprises:

(4.1) obtaining a second dataset, wherein the second dataset comprises a plurality of data pairs, and each of the data pairs in the second dataset comprises a video frame and an audio clip, and a matching value between the video frame and the audio clip;

(4.2) extracting a visual feature of each video frame and an auditory feature of each audio clip in each of the data pairs in the second dataset using the trained multi-channel feature extraction network;

(4.3) fusing the visual feature and the auditory feature of each of the data pairs in the second dataset to obtain a fusion feature of each of the data pairs in the second dataset;

(4.4) establishing the classifier and training the classifier using the fusion feature; and (4.5) determining whether an input audio-visual data pair to be determined is matched using the trained classifier.

3. The method of claim 2, wherein a step of training the classifier using the fusion feature in the step (4.4) comprises:

training the classifier by taking the fusion feature as an input of the classifier and combining the input with a preset loss function model.

4. The method of claim 3, wherein the preset loss function model is expressed as follows:

$$L_c = -\frac{1}{N}\sum_{j=1}^{N}(y_j\log(f(z_{concat};\theta_c)) + (1-y_j)\log(1-f(z_{concat};\theta_c)));$$

wherein, if $y_j=1$, $z_{concat}$ is the fusion feature obtained from a matched data pair in the second dataset; if $y_j=0$, $z_{concat}$ is the fusion feature obtained from an unmatched data pair in the second dataset; $\theta_c$ is the parameter of the classifier network model; N is the number of the data pairs in the second dataset.

5. The method of claim 1, wherein the step (2) comprises:

establishing a visual feature extraction network model and an auditory feature extraction network, to extract the visual feature of each video frame and the auditory feature of each audio clip in the first dataset, respectively.

6. The method of claim 5, wherein a 3D convolutional layer, a 2D convolutional layer and a fully connected layer are connected in sequence to form the visual feature extraction network.

7. The method of claim 5, wherein a plurality of convolutional layers and a fully connected layer are connected in sequence to form the auditory feature extraction network.

8. The method of claim 1, wherein the step (3.3) comprises:

(3.3.1) approximately processing the established contrastive loss function model; and (3.3.2) training the multi-channel feature extraction network using the approximately processed contrastive loss function model.

9. An electronic device for processing audio and video data, comprising:

a communicator, for communicating with external devices;

a memory, for storing a computer program; and a processor, connected to the communicator and the memory, for running the computer program to execute the method of claim 1.

10. A non-transitory computer-readable storage medium having thereon stored a computer program, wherein the computer program, when executed by a computer, causes the computer to perform the method of claim 1.

* * * * *